US012085675B2

(12) United States Patent
Finkelstein et al.

(10) Patent No.: US 12,085,675 B2
(45) Date of Patent: Sep. 10, 2024

(54) AUTOMATIC GAIN CONTROL FOR LIDAR FOR AUTONOMOUS VEHICLES

(71) Applicant: Sense Photonics, Inc., Durham, NC (US)

(72) Inventors: Hod Finkelstein, Berkeley, CA (US); Scott Burroughs, Raleigh, NC (US); Russell Kanjorski, Chapel Hill, NC (US); Brent Fisher, Bethesda, MD (US)

(73) Assignee: Sense Photonics, Inc., Durham, NC (US)

( * ) Notice: Subject to any disclaimer, the term of this patent is extended or adjusted under 35 U.S.C. 154(b) by 976 days.

(21) Appl. No.: 16/377,598

(22) Filed: Apr. 8, 2019

(65) Prior Publication Data

US 2019/0310375 A1    Oct. 10, 2019

Related U.S. Application Data

(60) Provisional application No. 62/654,972, filed on Apr. 9, 2018.

(51) Int. Cl.
*G01S 7/481* (2006.01)
*G01S 7/484* (2006.01)
(Continued)

(52) U.S. Cl.
CPC ............ *G01S 7/4815* (2013.01); *G01S 7/484* (2013.01); *G01S 7/4868* (2013.01); *G01S 17/894* (2020.01)

(58) Field of Classification Search
CPC .................................................. G01S 7/4868
See application file for complete search history.

(56) References Cited

U.S. PATENT DOCUMENTS 9,294,754 B2   3/2016  Billerbeck et al.
9,933,513 B2*  4/2018  Dussan et al.
(Continued)

FOREIGN PATENT DOCUMENTS

CN       1667354 A    9/2005
CN     105849620 A    8/2016
(Continued)

OTHER PUBLICATIONS

Extended European Search Report corresponding to European Application No. 19784971.4 (14 pages) (Nov. 2, 2021).
(Continued)

*Primary Examiner* — Yuqing Xiao
*Assistant Examiner* — Zhengqing Qi
(74) *Attorney, Agent, or Firm* — Kilpatrick Townsend & Stockton LLP (57) ABSTRACT

A LIDAR system includes an emitter array configured to illuminate a field of view, a detector array configured to image the field of view, and a control circuit. The emitter array includes one or more emitter elements that are configured to emit respective optical signals responsive to respective emitter control signals. The detector array includes one or more detector elements configured to output respective detection signals responsive to light incident thereon. The control circuit is configured to generate the respective emitter control signals based on the respective detection signals and respective spatial correlations of the one or more emitter elements and the one or more detector elements with respect to the field of view. Related devices and methods of operation are also discussed.

23 Claims, 6 Drawing Sheets

(51) Int. Cl.
*G01S 7/486* (2020.01)
*G01S 17/894* (2020.01)

(56) References Cited

U.S. PATENT DOCUMENTS

| | | |
|---|---|---|
| 2012/0038903 A1 | 2/2012 | Weimer et al. |
| 2015/0131080 A1 | 5/2015 | Retterath et al. |
| 2015/0293228 A1 | 10/2015 | Retterath et al. |
| 2015/0362585 A1* | 12/2015 | Ghosh ............... G01S 17/10 250/208.1 |
| 2016/0164261 A1* | 6/2016 | Warren ............... H04N 23/11 372/50.122 |
| 2016/0182789 A1* | 6/2016 | Wan et al. ............ H04N 5/2256 |
| 2017/0120804 A1 | 5/2017 | Kentley et al. |
| 2017/0176575 A1* | 6/2017 | Smits ............... G01S 7/4808 |
| 2017/0242108 A1 | 8/2017 | Dussan et al. |
| 2017/0301716 A1* | 10/2017 | Irish ............... H01L 27/14634 |
| 2017/0307736 A1* | 10/2017 | Donovan ............... G01S 7/484 |
| 2017/0343670 A1 | 11/2017 | Matthews |
| 2018/0120424 A1* | 5/2018 | Eshel ............... G02B 26/0858 |
| 2018/0143324 A1* | 5/2018 | Keilaf et al. .......... G01S 17/936 |
| 2018/0301872 A1 | 10/2018 | Burroughs et al. |
| 2020/0025879 A1* | 1/2020 | Pacala ............... G02B 3/0006 |
| 2020/0249318 A1 | 8/2020 | Henderson et al. |

FOREIGN PATENT DOCUMENTS

| | | |
|---|---|---|
| DE | 10162668 A1 | 7/2003 |
| DE | 10162668 B4 | 3/2004 |
| EP | 2787368 A1 | 10/2014 |

OTHER PUBLICATIONS

Notification of Transmittal of the International Search Report and the Written Opinion of the International Searching Authority, or the Declaration, in corresponding PCT Application No. PCT/US2019/026283 (Jul. 25, 2019).

CN201980031252.1, "Office Action", Feb. 6, 2024, 18 pages.

EP19784971.4, "Office Action", Jan. 30, 2024, 11 pages.

Rosprim et al., "Progress in Optimization of Highpower High-speed VCSEL Arrays", Proceedings of SPIE, vol. 10122, Feb. 24, 2017, pp. 1012205-1-1012205-10.

* cited by examiner

AUTOMATIC GAIN CONTROL FOR LIDAR FOR AUTONOMOUS VEHICLES

CLAIM OF PRIORITY

This application claims priority from U.S. Provisional Application No. 62/654,972, filed with the United States Patent and Trademark Office on Apr. 9, 2018, the disclosure of which is incorporated by reference herein.

FIELD

The subject matter herein relates generally to three-dimensional (3D) imaging, and more specifically to LIDAR (Light Detection And Ranging) systems for 3D imaging.

BACKGROUND

Time of flight (ToF) based imaging is used in a number of applications including range finding, depth profiling, and 3D imaging (e.g., Light Detection And Ranging (LIDAR), also referred to herein as lidar). Flash LIDAR, which can use a pulsed light emitting array to emit light for short durations over a relatively large area to acquire images based on sensing of the reflected light emission, may allow for solid-state imaging of a large field of view. In specific applications, the sensing of the reflected light may be performed using a detector array of single-photon detectors, such as a Single Photon Avalanche Diode (SPAD) detector array. SPAD detector arrays may be used as solid-state detectors in imaging applications where high sensitivity and timing resolution are desired.

However, to illuminate a large field of view (which may include long range and/or low-reflectivity targets and in bright ambient light conditions) and receive a recognizable return or reflected optical signal therefrom (also referred to herein as an echo signal), higher optical emission power may be required, which may be inefficient and/or undesirable. That is, higher emission power (and thus higher power consumption) may be required in some applications due to the relatively high background noise levels from ambient and/or other non-LIDAR emitter light sources (also referred to therein as a noise floor). This can be problematic in some applications, e.g., unmanned aerial vehicle (UAV), automotive, and industrial robotics. For example, higher emission power may result in increased power consumption, while higher optical energy may fail to meet eye-safety requirements. Also, heat generated from the higher emission power may alter the optical performance of the light emitting array and/or may negatively affect reliability.

SUMMARY

Some embodiments described herein provide methods, systems, and devices including electronic circuits to address the above and other problems without substantially impacting overall system performance of a LIDAR system including one or more laser emitter elements (including semiconductor lasers, such as surface- or edge-emitting laser diodes; generally referred to herein as emitters) and one or more light detector elements (including semiconductor photodetectors, such as photodiodes; generally referred to herein as detectors).

According to some embodiments, a LIDAR system includes a control circuit that is configured to receive respective detection signals that are output from operation of detector elements and control generation of respective control signals for operation of emitter elements (and/or the detector elements) based on the respective detection signals. The control signals are configured to control temporal and/or spatial operation of individual emitter elements of an emitter array and/or individual detector elements of a detector array, based on the detection signals from one or more detector elements of the detector array and predetermined spatial correlations of or correspondences between the individual emitter and detector elements (and/or sub-arrays thereof) with respect to the field of view.

According to some embodiments, a LIDAR system includes an emitter array configured to illuminate a field of view, a detector array configured to image the field of view, a driver circuit, and a control circuit. The emitter array includes one or more emitter elements that are configured to emit respective optical signals responsive to respective emitter control signals. For example, the emitter array may include two or more emitter sub-arrays, each including respective subsets of the emitter elements. The driver circuit may include respective driver sub-circuits coupled to the respective emitter sub-arrays. The detector array includes one or more detector elements that are configured to output respective detection signals responsive to light incident thereon. The control circuit is configured to generate the respective emitter control signals (via the respective driver sub-circuits or otherwise) based on the respective detection signals and respective spatial correlations of the one or more emitter elements and the one or more detector elements with respect to the field of view.

In some embodiments, the respective optical signals differ at different spatial locations of the emitter array based on the respective detection signals and the respective spatial correlations of the one or more emitter elements with respect to the field of view.

In some embodiments, the respective detection signals output from first and second subsets of the detector elements indicate first and second reflectances of first and second targets in the field of view, respectively. The first reflectance may be less than or greater than the second reflectance.

In some embodiments, the respective emitter control signals are configured to activate first and second subsets of the emitter elements at different spatial locations of the emitter array to emit first and second optical signals, respectively, based on the respective spatial correlations thereof with the first and second subsets of the detector elements, respectively. The first and second subsets of the emitter elements may be first and second sub-arrays of the respective emitter sub-arrays. In some embodiments, the first and second optical signals have first and second power levels, respectively, where the first power level is greater than the second power level.

In some embodiments, the control circuit is configured to generate respective detector control signals based on the respective detection signals and the respective spatial correlations of the one or more emitter elements and the one or more detector elements with respect to the field of view.

In some embodiments, the respective detector control signals are configured to activate the first and second subsets of the detector elements for first and second durations of time or sensitivity levels, respectively, where the first duration or sensitivity level is greater than the second duration or sensitivity level.

In some embodiments, the respective detection signals output from first and second subsets of the detector elements indicate the first and second reflectances, respectively, responsive to the first target being located at a greater distance from the detector array than the second target.

In some embodiments, the respective detection signals output from first and second subsets of the detector elements indicate the first and second reflectances, respectively, responsive to the first target being of lower or higher reflectivity than the second target.

In some embodiments, the respective detection signals output from first and second subsets of the detector elements indicate a combination of distance from the detector and reflectivity such that the photon flux from the first detector is lower or higher than the photon flux from the second target.

In some embodiments, the respective detection signals indicate relative motion between the LIDAR system and a target in the field of view. The control circuit is configured to estimate an expected position of the target in the field of view based on the relative motion. The respective optical signals differ based on the expected position of the target and the respective spatial correlations of the emitter elements with respect to the field of view.

In some embodiments, the LIDAR system is configured to be coupled to an autonomous or other vehicle such that the emitter and detector arrays are oriented relative to an intended direction of travel of the vehicle.

According to some embodiments, a method of operating a LIDAR system includes performing operations by a control circuit. The operations include receiving, from a detector array that is configured to image a field of view, respective detection signals that are output from one or more detector elements of the detector array responsive to light incident thereon; generating, by a driver circuit including respective driver sub-circuits, respective emitter control signals based on the respective detection signals and respective spatial correlations of one or more emitter elements of an emitter array and the one or more detector elements with respect to the field of view; and transmitting, to the emitter array, the respective emitter control signals to activate the one or more emitter elements to emit respective optical signals to illuminate the field of view. For example, the emitter array may include respective emitter sub-arrays, each including one or more emitter elements, and the respective driver sub-circuits may provide the respective emitter control signals to the respective emitter sub-arrays.

According to some embodiments, a LIDAR system includes a control circuit that is configured to provide respective emitter control signals to one or more emitter elements to emit respective optical signals at respective power levels. The respective emitter control signals are output based on receiving respective detection signals from one or more detector elements indicating respective reflectances of one or more targets in a field of view thereof, and based on respective spatial correlations of the one or more emitter elements and the one or more detector elements with respect to the field of view.

In some embodiments, the LIDAR system further includes an emitter array including first and second emitter sub-arrays including first and second subsets of the emitter elements, respectively, and a driver circuit including first and second driver sub-circuits coupled to the first and second emitter sub-arrays, respectively. The control circuit is configured to operate the first and second driver sub-circuits to generate the respective emitter control signals to control operation of first and second subsets of the emitter elements at first and second spatial locations of the emitter array to emit first and second optical signals having different first and second power levels, respectively, based on the respective detection signals and the respective spatial correlations.

In some embodiments, the one or more targets include first and second targets and the respective reflectances indicate first and second reflectances thereof, respectively. The first reflectance may be less than the second reflectance, and the first power level may be greater than the second power level.

In some embodiments, the LIDAR system further includes a detector array including the detector elements. The control circuit is further configured to output respective detector control signals that are configured to control operation of first and second subsets of the detector elements at first and second spatial locations of the detector array for first and second durations of time or sensitivity levels, respectively, based on the respective detection signals and the respective spatial correlations.

In some embodiments, the LIDAR system includes an algorithm or circuit that is configured to track relative motion of targets based on detection signals corresponding to one or more frames and control the illumination power at respective spatial locations of the emitter array based on the expected position of the targets in one or more subsequent frames.

In some embodiments the control circuit implements an algorithm or circuitry whereby, even if a highly reflective target is imaged or detected at a zone of illumination in the field of view, the control circuit is configured to generate a periodic pulse or sequence of pulses to operate the emitter elements having a spatial location that corresponds to the zone to emit higher power light in order to check or detect whether less reflective targets may be present in that zone. That is, responsive to the first reflectance being greater than the second reflectance, the control circuit may generate the respective emitter control signals such that the first power level is greater than the second power level for detection of less reflective targets in a particular zone having a more reflective target.

In some embodiments the control circuit implements an algorithm or circuitry that is configured to generate the respective emitter control signals to provide two levels of illumination for each illumination zone in the field of view.

In some implementations the control circuit implements an algorithm or circuitry that is configured to generate the respective emitter control signals to provide more than two levels of illumination for each illumination zone in the field of view. For example, a subset of the emitter elements that are spatially correlated to a respective illumination zone may be configured to emit optical signals having one of a plurality of discrete illumination levels (for example, three different illumination levels) based on the respective detection signals from a subset of the detectors that are spatially correlated to the respective illumination zone.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION OF EMBODIMENTS

A LIDAR system may include an array of emitter elements and an array of detector elements, or a system having a single emitter element and an array of detector elements, or a system having an array of emitters and a single detector element. A flash LIDAR system may acquire images by emitting light from an array of emitter elements for short durations (pulses) over a field of view (FoV) and detecting the reflected light emission. A non-flash or scanning LIDAR system may generate image frames by raster scanning light emission (continuously) over a field of view, for example, using a point scan or line scan to emit the necessary power per point and sequentially scan to reconstruct the full field of view (FOV) from detection of the reflected light emission.

Some embodiments described herein arise from recognition that some conventional LIDAR systems may operate at higher or maximum power levels to image longer-range and/or lower-reflectivity targets to account for worst-case conditions, but such worst-case conditions may not occur or may occur for only a small part of the field of view in a majority of imaging scenarios.

Embodiments described herein are thus directed to adaptive illumination schemes that can reduce emitter power in LIDAR operation, for flash or non-flash/scanning LIDAR applications. In particular, embodiments of the present disclosure provide emitters and associated control circuits that are configured to adaptively adjust output power of one or more emitter elements of the emitter array, for example, respective sub-arrays of the emitter array, based on the detection signals from one or more detector elements of the detector array and a known spatial correlation of or correspondence between the individual emitter and detector elements (or sub-arrays thereof) with respect to the field of view.

Figure 1:
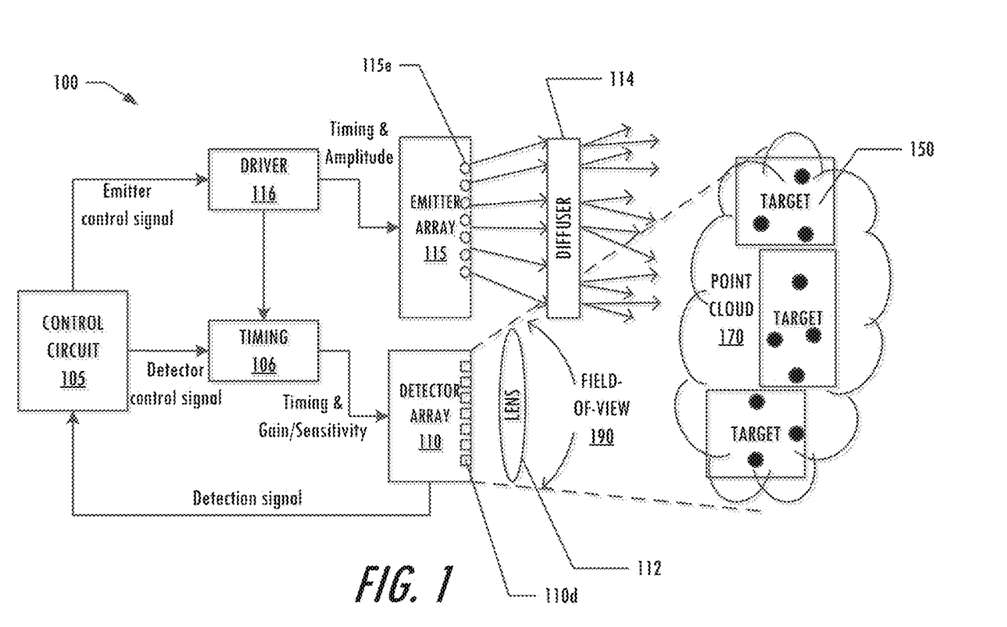
FIG. 1 is a block diagram illustrating example components of a time of flight LIDAR measurement system or circuit in accordance with some embodiments described herein.

An example of a flash LIDAR system or circuit 100 is shown in FIG. 1. The system 100 includes a control circuit 105, a timing circuit 106, an emitter array 115 including a plurality of emitters 115e, and a detector array 110 including a plurality of detectors 110d (for example, an array of single-photon detectors). The emitter elements 115e of the emitter array 115 respectively emit a radiation pulse (for example, through a diffuser or optical filter 114) at a time controlled by a timing generator or driver circuit 116. In particular embodiments, the emitters 115e may be pulsed light sources, such as LEDs or lasers (such as vertical cavity surface emitting lasers (VCSELs)). The maximum optical power output of the light source 115e may be selected to generate a signal-to-noise ratio of the echo signal from the farthest, least reflective target at the brightest background illumination conditions that can be detected in accordance with embodiments described herein.

In some embodiments, each of the emitter elements 115e in the emitter array 115 is connected to and controlled by a respective driver circuit 116. In other embodiments, respective groups of emitter elements 115e in the emitter array 115 (e.g., emitter elements 115e in spatial proximity to each other), may be connected to a same driver circuit 116. The driver circuit or circuitry 116 may include one or more driver transistors, which are configured to control the timing and amplitude of the optical emission signals that are output from the emitters 115e. A diffuser 114 is illustrated to increase a field of view of the emitter array 115 by way of example.

Light emission output from one or more of the emitters 115e impinges on and is reflected by one or more targets 150, and the reflected light is detected as an optical signal (also referred to herein as an echo signal or echo) by one or more of the detectors 110d (e.g., via one or more lenses 112), converted into an electrical signal representation, and processed (e.g., based on time of flight) to define a 3-D point cloud representation 170 of the field of view 190.

More particularly, the detector array 110 generates respective detection signals indicating the respective times of arrival of photons in the reflected optical signal, and outputs the respective detection signals to the control circuit 105. In some embodiments, the control circuit 105 may include a pixel processor that measures the time of flight of the illumination pulse over the journey from the emitter array 115 to a target 150 and back to the detector array 110 (i.e., the time between emission of the optical signal by the emitter array 115 and the time of arrival of the reflected optical signal or echo at the detector array 110, as indicated by the respective detection signals) and calculates the distance to the target 150. Operations of LIDAR systems in accordance with embodiments of the present invention as described herein may be performed by one or more processors or controllers, such as the control circuit 105 of FIG. 1. Portions or an entirety of the control circuits described herein may be integrated in the emitter array 115 and/or detector array 110 in some embodiments.

Still referring to FIG. 1, each of the detector elements 110d of the detector array 110 is connected to a timing circuit 106. The timing circuit 106 may be phase-locked to the driver circuitry 116 of the emitter array 115. The sensitivity of each of the detector elements 110d or of groups of detector elements 110d (described herein with reference to respective sensitivity levels) may be controlled by the timing circuit 106. For example, when the detector elements 110d include reverse-biased photodiodes, avalanche photodiodes (APD), PIN diodes, and/or Geiger-mode Avalanche Diodes (SPADs), the reverse bias may be adjusted by the timing circuit 106, whereby, the higher the overbias, the higher the sensitivity level. When the detector elements 110d include integrating devices such as a CCD, CMOS photogate, and/or photon mixing device (pmd), the charge integration time may be adjusted by the timing circuit 106 such that a longer integration time translates to higher sensitivity.

In some embodiments, the light emission from individual emitters 115e is not mixed with that of other emitters 115e. In some embodiments, the light emission from individual emitters is mixed, e.g., by using the diffuser 114, but some spatial correlation is maintained between the emission profile of individual emitter elements 115e and the diffused light illuminating the scene. Without loss of generality, embodiments described below assume that the diffuser shown in FIG. 1 is not present.

In some embodiments, multiple or all of the emitters 115e are activated simultaneously. Reflected signals from various targets 150 return to the detector array 110 and are detected by one or more of the detectors 110d, which output respective detection signals in response.

Although illustrated with reference to a flash LIDAR system, it will be understood that embodiments described herein may include non-flash or scanning (also referred to as "line scanning" or "point scanning" without loss of generality to other types of scanning) LIDAR systems as well. In a scanning LIDAR system or circuit, a target may be detected by one or more detectors 110d of the detector array 110 that are spatially arranged to image a respective angular position of the field of view (FOV) 190, and the control circuit 105 and/or driver circuit 116 may control the scanning of the emitter(s) 115e to alter the power of the optical signals emitted therefrom levels (e.g., to reduce power level) each time the emitter(s) 115e scan the angular position. That is, emitter power may be differently controlled at different angular or rotational positions of a FOV based on detection signals received from detectors having respective spatial correlations to the angular positions.

Embodiments described herein are directed to operations for controlling the temporal and/or spatial operation of the individual emitter elements 115e and/or the individual detector elements 110d based on detection signals from one or more of the individual detector elements 110d of the detector array and known or predetermined spatial correlations of the individual emitter 115e and detector elements 110d with respect to the field of view.

In some embodiments, both flash and scanning LIDAR systems as described herein may employ motion estimation algorithms or circuits to detect and estimate the position of moving targets (relative to the LIDAR system) over the field of view, and adjust output signals from the emitters based on expected positions of the object and spatial correlations with corresponding areas of the field of view. For example, the control circuit 105 may receive detection signals from respective detector elements 110d of the detector array 110 that indicate relative motion of a target 150 over the field of view 190, e.g., based on differences in the indicated reflectances and/or ranges in sequentially received detection signals (e.g., corresponding to sequential image frames) from respective detectors 110d at respective spatial locations of the detector array 110. The control circuit 105 may determine that the target 150 is moving and may estimate an expected position of the target 150 in the field of view 190 based on the sequentially-received detection signals, and the control circuit 105 (via the driver circuit 116) may generate respective emitter control signals to adjust the power levels of the optical signals output from one or more of the emitters 115e that are spatially correlated to the expected position(s) of the target 150 (e.g., in a next or future image frame) in the field of view 190. The control circuit 105 may likewise output respective emitter control signals that adjust the power levels of optical signals output from one or more of the emitters 115e that are spatially correlated to the position (s) of the field of view 190 at which the target 150 was detected (as indicated by the detection signals from spatially-correlated detectors 110d), but is expected to leave, based on the detected relative motion and expected position. That is, the spatial operation of the emitter elements 115e described herein may be based on actual or expected positions of a target 150, and thus, the spatial correlation between the field of view 190 and the detector 110d from which a particular detection signal is output may not necessarily correspond to the spatial correlation between the field of view 190 and the emitter 115e from which an optical signal is emitted based on or responsive to that particular detection signal.

In some embodiments, the control circuit 105 (or other processor and memory associated therewith) may store predetermined spatial correlations between specific regions of the field of view that are illuminated by specific emitters in the array, and specific regions of the field of view that are imaged by specific detectors in the detector array. For example, a calibration process may be performed to determine emitter-detector correlation, e.g., by activating individual or groups of emitters and storing results of detection by individual or groups of detectors (e.g., as indicated by the point cloud) in a lookup table in the memory. Reflected light may be distinguished for emitter/detector correlation purposes using a variety of techniques for operating respective emitters and/or detectors, including but not limited to different pulse encoding, different phase encoding, different emission wavelengths, different optical diffusion, and different optical filtering.

Figure 2:
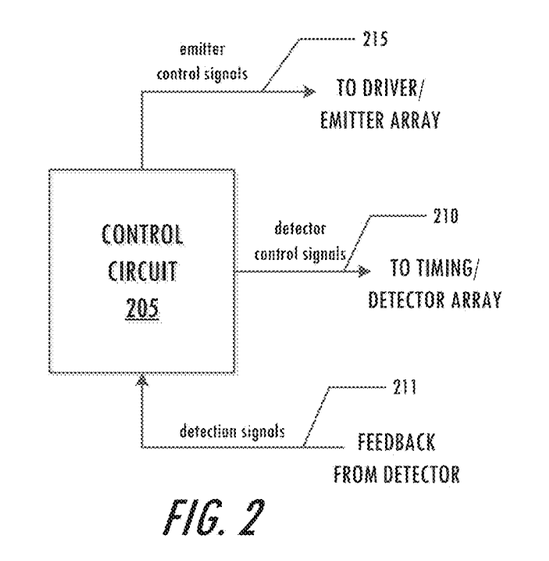
FIG. 2 is a block diagram illustrating an example control circuit that receives detection signals output from respective detector elements and generates control signals to respective emitter elements in response in accordance with some embodiments described herein.

In some embodiments, respective detection signal outputs from one or more detectors of the array are input to a control circuit, such as a microcontroller or microprocessor, which feeds back a respective control signal to the driver circuitry of the respective emitter having the spatial correlation to that detector. An example of a control circuit 205 that receives detection signals 211 output from respective detector elements 110d of the detector array 110 as feedback and generates control signals 215 to respective emitter elements (and/or control signals 210 to respective detector elements) in response is shown in FIG. 2. The control circuit 205 of FIG. 2 may represent one or more control circuits, for example, the control circuit 105 described above, an emitter control circuit (which may include the driver circuitry 116) that is configured to provide emitter control signals 215 to the emitter array 115, and/or a detector control circuit (which may include the timing circuitry 106) that is configured to provide the detector control signals 210 to the detector array 110 as described herein. In some embodiments, the control circuit 205 may include a sequencer circuit that is configured to coordinate operation of the emitters 115e and detectors 110d. More generally, the control circuit 205 may include one or more circuits that are configured to generate respective emitter control signals 215 that control the respective power levels of the optical signals output from the emitters 115e, and/or to generate respective detector control signals 210 (such as strobe signals) that control the timing and/or durations of activation of the detectors 110d (e.g., for respective strobe windows between the pulses of the optical signals from the emitters 115e), based on the detection signals 211 from one or more of the detectors 110d and known or predetermined spatial correlations or correspondence between subsets of the emitters 115e and subsets of the detectors 110d with respect to the field of view.

In some embodiments, the respective detection signals 211 output from the detector array 110, which may be used as feedback signals to control temporal and/or spatial operation of the emitters 115e and/or detectors 110d as described herein, may indicate one of the following scenarios: (i) an optical signal is detected within a desired signal-to-noise level (SNR)(where the signal may correspond to the emission wavelength(s) of the optical signals output from the emitters and noise may be attributed to effects of ambient light) and below detector saturation; (ii) an optical signal is detected below a desired SNR and below detector saturation; (iii) an optical signal is detected above a desired SNR and below detector saturation; (iv) the detector is saturated; (v) no target is detected.

The respective detection signals 211 output from the detector array 110 are input to the control circuit 205. In response to receiving these feedback signals 211 from one or more detector elements 110d indicating the scenarios (i) to (v) above, the control circuit 205 may be configured to generate and provide emitter control signals 215 (e.g., via the driver circuit 116) to control operation of one or more of the emitters 115e based on the spatial correlations to respective detectors 110d from which the respective detection signals 211 were received as follows, for the scenarios (i) to (v) above, respectively: (i) maintain emission energy for the optical signals output from the emitter(s) 115e; (ii) increase emission energy for the optical signals output from the emitter(s) 115e; (iii) decrease emission energy for the optical signals output from the emitter(s) 115e; (iv) decrease emission energy for the optical signals output from the emitter(s) 115e; (v) drive a preset energy for the optical signals output from the emitter(s) 115e, where the preset energy is less than the maximum energy.

In some embodiments, in response to receiving the feedback signals 211 from one or more detector elements 110d indicating the scenarios (i) to (v) above, the control circuit 205 may be configured to generate respective detector control signals 210 to control operation of one or more (spatially-correlated) detectors 110d to change its gain. Gain control can vary based the type of detector 110d, for example by altering a reverse bias and/or a charge integration time of the detector 110d. In some embodiments, the detector control signals 210 may alter the gain of a respective spatially-correlated detector 110d (alone or in combination with generation of the emitter control signals 215) as follows, for the scenarios (i)-(v) above, respectively: (i) maintain gain/sensitivity level of the respective detector(s) 110d; (ii) increase gain/sensitivity level of the respective detector(s) 110d; (iii) decrease gain/sensitivity level of the respective detector(s) 110d; (iv) decrease gain/sensitivity level of the respective detector(s) 110d; (v) modify operation of the respective detector(s) 110d to provide nominal gain/sensitivity level.

Figure 3:
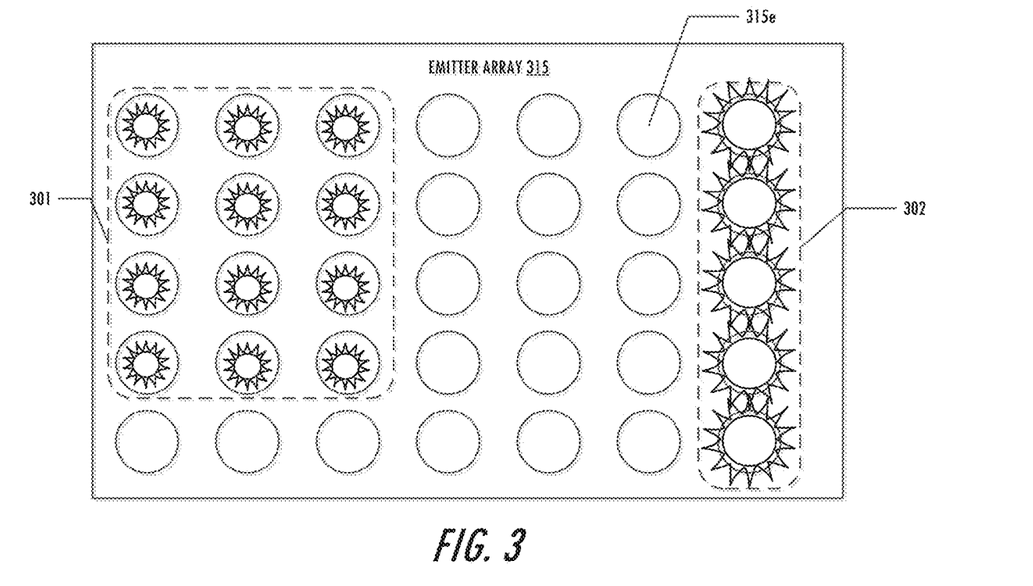
FIG. 3 is a block diagram illustrating an example emitter array including respective optical emitter elements in accordance with embodiments described herein.
Figure 4:
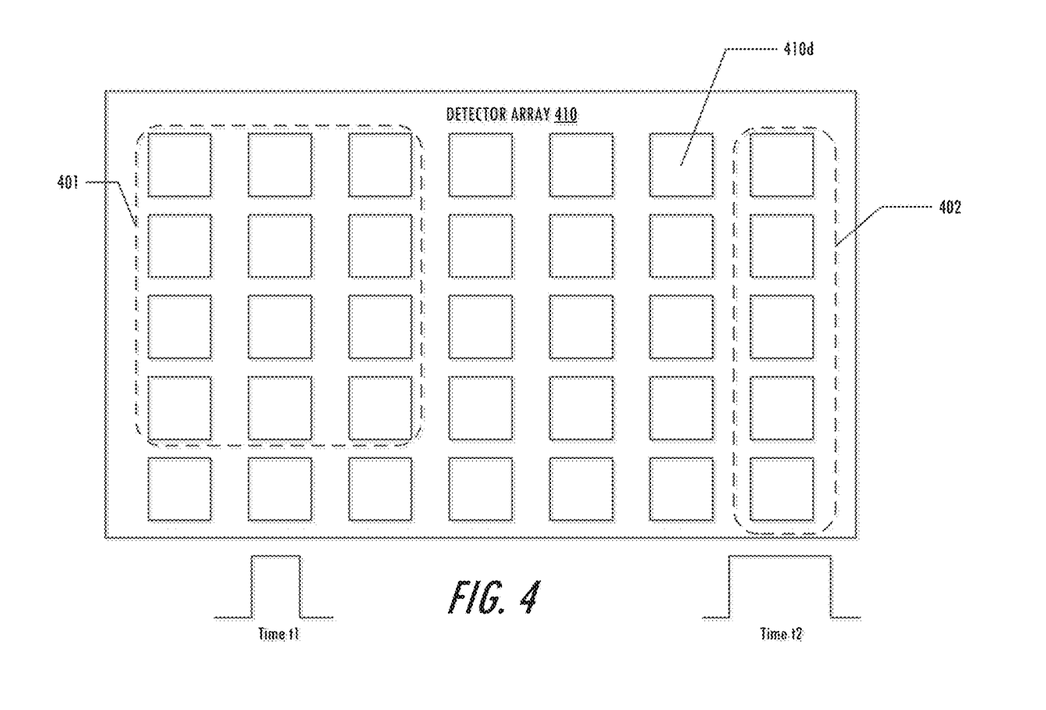
FIG. 4 is a block diagram illustrating an example detector array including respective detector elements in accordance with embodiments described herein.

FIG. 3 and FIG. 4 illustrate an example emitter array 315 including respective optical emitter elements 315e and an example detector array 410 including respective detector elements 410d in accordance with embodiments described herein, respectively. The example emitter array 315 and detector array 410 shown in FIGS. 3 and 4 may represent the emitter array 115 and detector array 110 of FIG. 1, respectively. FIGS. 3 and 4 illustrate a one-to-one correlation or correspondence of emitter elements 315e and detector elements 410d by way of example only, and it will be understood that fewer or more emitter elements 315e or detector elements 410d (and thus, one-to-many or many-to one emitter-detector correlations) may be provided in accordance with embodiments described herein.

In some embodiments, the control circuit 205 is configured to differently operate respective emitter elements 315e and/or detector elements 410d at different spatial positions of the emitter array 310 and/or detector array 410 (also referred to herein as controlling spatial operation of the elements of the arrays). In particular embodiments, the control circuit 205 is configured to differently operate respective emitter elements 315e at different spatial positions of the emitter array 310 to emit light/optical signals with different power levels, based on respective detection signals received or fed-back from corresponding detector elements 410d of the detector array 410.

For example, in an operating environment including a more distant or dimmer target having a lower reflectance and a more proximate or brighter target having a higher reflectance (relative to the LIDAR system 100), the control circuit 205 may be configured to selectively operate a subset 301 of the emitter elements 315e (whose light emission is directed towards the proximate target) to emit optical signals having a lower power level responsive to receiving detection signal (s) from one or more spatially-correlated detector elements 410d (e.g., of subset 401) indicating the higher reflectance, and may selectively activate a different subset 302 of the emitter elements 315e (whose light emission is directed towards the distant target) to emit light having a higher power level responsive to receiving detection signal(s) from one or more spatially-correlated detector elements 410d (e.g., of subset 402) indicating the lower reflectance. This is illustrated in the operation of the example emitter array 310 shown in FIG. 3, where one subset 301 of the emitter elements 315e (on the left side of the illustrated emitter array 310) is operated to emit optical signals at a lower power level (shown by smaller starbursts) than another subset 302 of the emitter elements 315e (on the right side of the illustrated emitter array 310), which are operated to emit optical signals at a higher power level (shown by larger starbursts).

That is, based on individual feedback signals from corresponding detector elements (or from a point cloud representation based thereon), control circuits described herein may be configured to apply different current levels to individual emitter elements, based on spatial position in the array and/or a range of a target, which may be used address dynamic range issues in some embodiments.

In some embodiments, the control circuit 205 is configured to operate respective emitter elements 315e and/or detector elements 410d with different timing or temporal constraints (also referred to herein as controlling temporal operation of the elements of the arrays). For example, responsive to operating one or more emitter elements 315e (e.g., of subset 301) to emit a first pulse of photons, the control circuit 205 may be configured to control a timing and/or sensitivity of operation of the spatially-correlated detector element(s) 410d (e.g., of subset 401) for a first period or "window" of time (e.g., x nanoseconds), for example, using a time gating scheme. Likewise, responsive to operating one or more emitter elements 315e (e.g., of subset 302) to emit a second pulse of photons, the control circuit 205 may be configured to control a timing and/or sensitivity of operation of the spatially-correlated detector element(s) 410d (e.g., of subset 402) for a second period/window of time (e.g., y nanoseconds) that is different from the first time period/window. This is illustrated in the operation of the example detector array shown in FIG. 4, where one subset 401 of the detector elements 410d (on the left side of the illustrated detector array 410) is operated for a shorter window/lesser duration of time (shown by pulse width t1) or using a lower reverse bias signal to provide reduced sensitivity, while another subset 402 of the detector elements 410d (on the right side of the illustrated detector array 410) is operated for a longer window/greater duration of time (shown by pulse width t2) or using a higher reverse bias signal to provide greater sensitivity. The subset 402 of the detector elements 410d may be operated for the longer window/greater duration of time and/or higher sensitivity level responsive to previously-received detection signals from the subset 402 indicating a target having less reflectance in a portion of the field of view to which the subset 402 is spatially correlated, while the subset 401 of the detector elements 410d may be operated for the shorter window/lesser duration of time and/or lower sensitivity level responsive to previously-received detection signals from the subset 401 indicating a target having greater reflectance in a portion of the field of view to which the subset 401 is spatially correlated.

In embodiments described herein, a detector time gate or strobe window may refer to the respective durations of activation and deactivation of one or more detectors (e.g., responsive to respective strobe signals from a control circuit) over the temporal period or time between pulses of the emitter(s) (which may likewise be responsive to respective emitter control signals from a control circuit). The time between pulses (which defines a laser cycle, or more generally emitter pulse frequency) may be selected or may otherwise correspond to a desired imaging distance range for the LIDAR system. Each strobe window may be differently delayed relative to the emitter pulses, and thus may correspond to a respective portion or subrange of the distance range. Each strobe window may also correspond to a respective image acquisition subframe (or more particularly, point cloud acquisition subframe, generally referred to herein as a subframe) of an image frame. That is, each image frame includes a plurality of subframes, each of the subframes samples or collects data for a respective strobe window over the temporal period, and each strobe window covers or corresponds to a respective distance subrange of the distance range.

Figure 5:
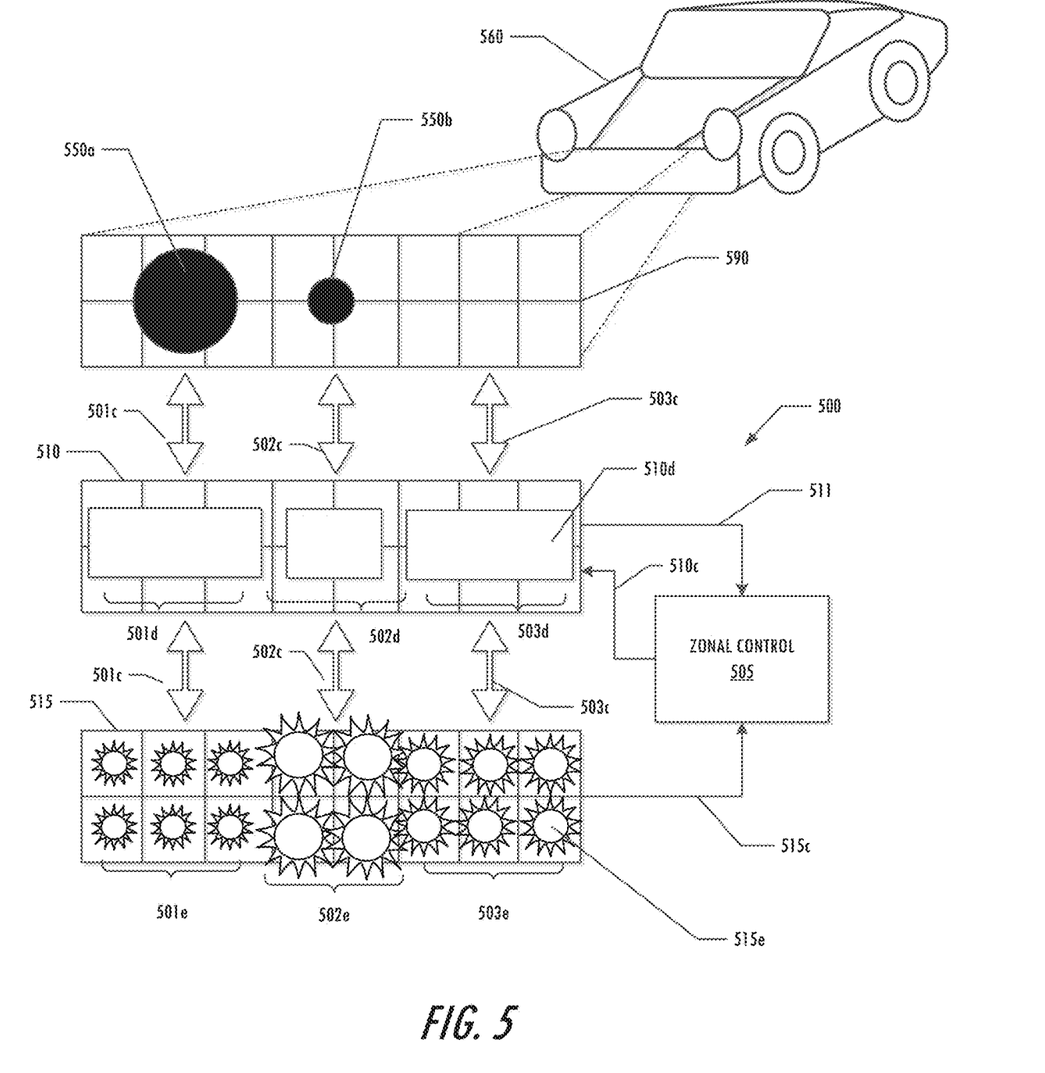
FIG. 5. is a block diagram illustrating an example of an automotive application of a time of flight LIDAR measurement system or circuit configured to provide zonal illumination control in accordance with some embodiments described herein.

Zonal illumination control provided by some flash LIDAR systems in automotive applications is shown in FIG. 5. The system 500 of FIG. 5 provides a wide FOV 590 over a distance range, for example, a 120×30 FOV covering a 200 meter (m) distance range (relative to the emitter/detector of the LIDAR system 500, illustrated as mounted in a vehicle 560). Such a system 500 may operate by flooding the FOV 590 with active illumination (e.g., as provided by vertical cavity surface emitting laser (VCSEL) pulses output from an array 515 of VCSELs 515e) and imaging the FOV 590 (e.g., as provided by operation of an array 510 of SPADs 510d), both spatially (covering the full FOV 590) and temporally (covering the full FOV 590 throughout period of operation).

In the example of FIG. 5, subsets or sub-arrays 501d, 502d, 503d of the detectors 510d of the detector array 510 are arranged to image respective portions of the FOV 590. Likewise, subsets 501e, 502e, 503e of the emitters 515e of the emitter array 515 are arranged to illuminate respective portions of the FOV 590, with spatial correlations or correspondences 501c, 502c, 503c between the subsets or sub-arrays 501e, 502e, 503e of the emitters 515e and the subsets 501d, 502d, 503d of the detectors 510d relative to the FOV 590, respectively. The FOV 590 is illustrated with reference to gridlines to highlight the spatial correlations with emitters 515e and detectors 510d, which are illustrated with reference to similar gridlines. The spatial correlations 501c, 502c, 503c may also be described herein with reference to zones 501e, 502e, 503e of the emitters array 515, zones 501d, 502d, 503d of the detector array 510, and/or zones of the FOV 590.

Figure 6:
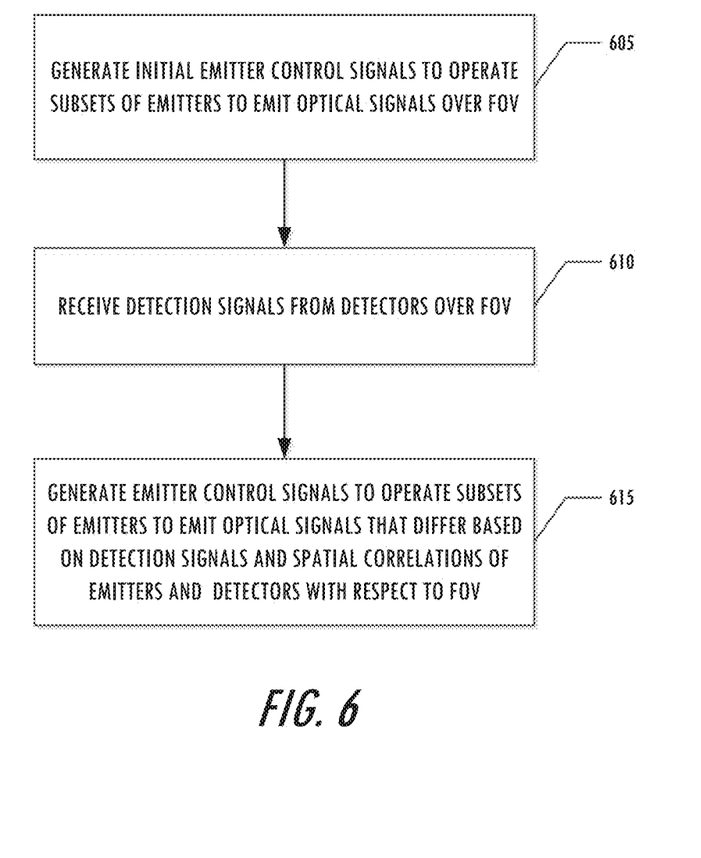
FIG. 6 is a flowchart illustrating example operations performed by a control circuit in a time of flight LIDAR measurement system or circuit in accordance with some embodiments described herein.

Example operation of the system 500 of FIG. 5 will be described with reference to the flowchart of FIG. 6. Referring now to FIGS. 5 and 6, the control circuit 505 generates initial emitter control signals 515c to operate subsets 501e, 502e, 503e of the emitters 515e to emit optical signals having a same or similar power level (e.g., a higher or maximal power level) at block 605. Echo signals corresponding to the optical signals are detected by subsets 501d, 502d, and 503d of the detectors 510d, and respective detection signals 511 from the detectors 510d are received at the control circuit 505 at block 610. The respective detection signals 511 may indicate the presence of a lower-reflectance target 550b towards a central portion of the FOV 590 and a higher-reflectance target 550a towards one side of the FOV 590, for example, based on return signal strengths indicated by the respective detection signals 511 from the subsets 502d and 501d of the detectors 510d that are spatially correlated (indicated by 502c and 501c) to the central and side portions of the FOV 590, respectively. The reflectances of the targets 550a and 550b may indicate the reflectivities of respective surfaces of the targets 550a and 550b and/or the respective distances of the targets 550a and 550b from the detector array 510. That is, the reflectances indicated by the detection signals described herein may indicate relative characteristics of the targets and/or relative distances of the targets with respect to the imaging system.

In response, the control circuit 505 generates respective emitter control signals 515c to operate the subsets 501e, 502e, 503e of the emitters 515e to emit optical signals having different power levels based on the detection signals 511 and the spatial correlations 501c, 502c, 503c between the subsets 501e, 502e, 503e of the emitters and the subsets 501d, 502d, 503d of the detectors 510d with respect to the FOV 590 at block 615. In particular, based on the indication of the lower-reflectance target 550b at the central portion of the FOV 590, the subset 502e of the emitters 515e that are spatially correlated to the central portion of the FOV 590 (indicated by 502c) are operated to emit optical signals with a higher output power (illustrated by larger starbursts). Likewise, based on the indication of the higher-reflectance target 550a at the side portion of the FOV 590, the subset 501e of the emitters 515e that are spatially correlated to the side or peripheral portion of the FOV 590 (indicated by 501c) are operated to emit optical signals with a lower output power (illustrated by smaller starbursts). Also, based on the indication of the absence of a target at the other side portion of the FOV 590, the subset 503e of the emitters 515e that are spatially correlated to the other side or peripheral portion of the FOV 590 (indicated by 503c) are operated to emit optical signals with a predetermined output power that is less than the maximal output power (illustrated by mid-sized starbursts).

In some embodiments, the control circuit 505 may be configured to intermittently or periodically operate all emitters 515e to emit optical signals at higher or maximal power in order to detect dimmer targets (which may not have been previously or otherwise detected) at block 605, and respective detection signals 511 received responsive to the maximal power emission at block 610 may be used to control the subsequent emission power of respective subsets of the emitters 515e at block 615, based on the relative power levels of the detection signals 511. For example, operation of the emitters 515e for range acquisition operations at block 615 may occur more frequently (e.g., 30 times per second), while maximal power (max-flash) at block 605 may occur less frequently (e.g., once per second).

Figure 7:
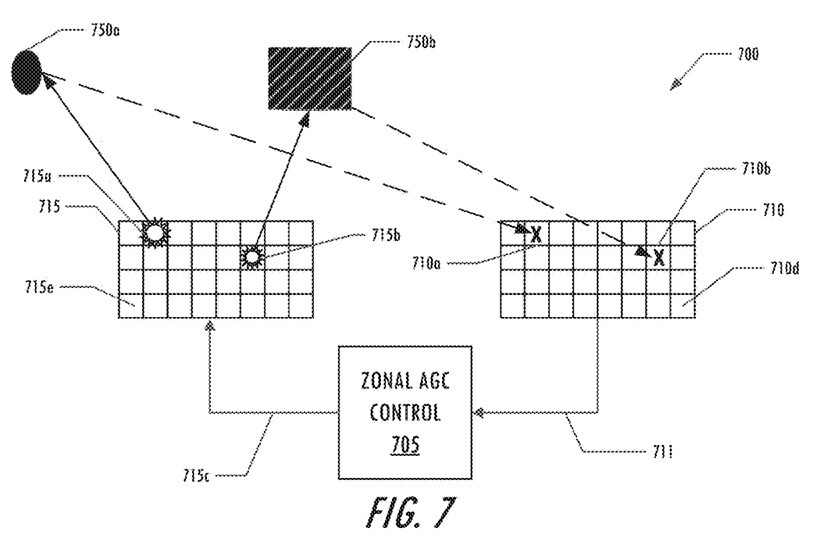
FIG. 7 is a block diagram illustrating a further example of a time of flight LIDAR measurement system or circuit configured to provide zonal illumination control in accordance with some embodiments described herein.

FIG. 7 is a block diagram illustrating another example of a time of flight LIDAR measurement system or circuit 700 configured to provide zonal illumination control in accordance with some embodiments described herein. As shown in FIG. 7, respective echo signals are detected by first and second subsets 710*a* and 710*b* of detectors 710*d* located at respective positions (illustrated by "x" symbols) of a detector array 710, and respective detection signals 711 are output from the detector array 710 to a zonal automatic gain control (AGC) control circuit 705. The respective detection signals 711 indicate the presence (and relative reflectances) of first and second targets 750*a* and 750*b* at regions of a field of view corresponding to the respective positions of the first and second subsets 710*a* and 710*b*, for example, based on return signal strengths indicated by the respective detection signals output therefrom. In response, the control circuit 705 generates respective emitter control signals 715*c* to operate first and second subsets 715*a* and 715*b* of emitters 715*e* at corresponding spatial positions of an emitter array 715 to emit first and second optical signals having different power levels (illustrated by differently-sized starburst symbols) to differently illuminate the regions of the field of view at which the targets 750*a* and 750*b* were detected, based on the respective detection signals 711 and the spatial correlations between the subsets 715*a*, 715*b* of the emitters 715*e* and the subsets 710*a*, 710*b* of the detectors 710*d* with respect to the FOV. In some embodiments, the control circuit may be further configured to operate the emitters and detectors in combination with operations for coverage and detection of different distance ranges (e.g., 0-50 meters, 50-90 meters), e.g., based on times corresponding to the ranges, as described for example in U.S. Provisional Patent Application No. 62/799,116 filed Jan. 31, 2019, the disclosure of which is incorporated by reference herein.

In some embodiments, an array of feedback control circuits and/or drive circuits as described herein may be integrated on a same chip. For example, the chip may be an LCD driver chip with very high parallelism, which may be configured to simultaneously drive the array of emitters to emit optical signals with different output power levels based on the spatial correlations of the emitters and the detectors (from which respective detection signals are received) relative to the FOV imaged thereby.

Thus, in some embodiments described herein, maximal emission may be limited to those emitter elements which illuminate the dimmest targets, and overall emission power may be significantly reduced by selective operation of one or more of the emitter elements based on feedback from spatially-correlated one(s) of the detector elements. In some embodiments, the detection signal-based feedback operations described herein may be performed for sub-regions or sub-arrays of the emitter array (including a subset of the emitters) and/or sub-regions or sub-arrays of the detector array (including a subset of the detectors).

Figure 8:
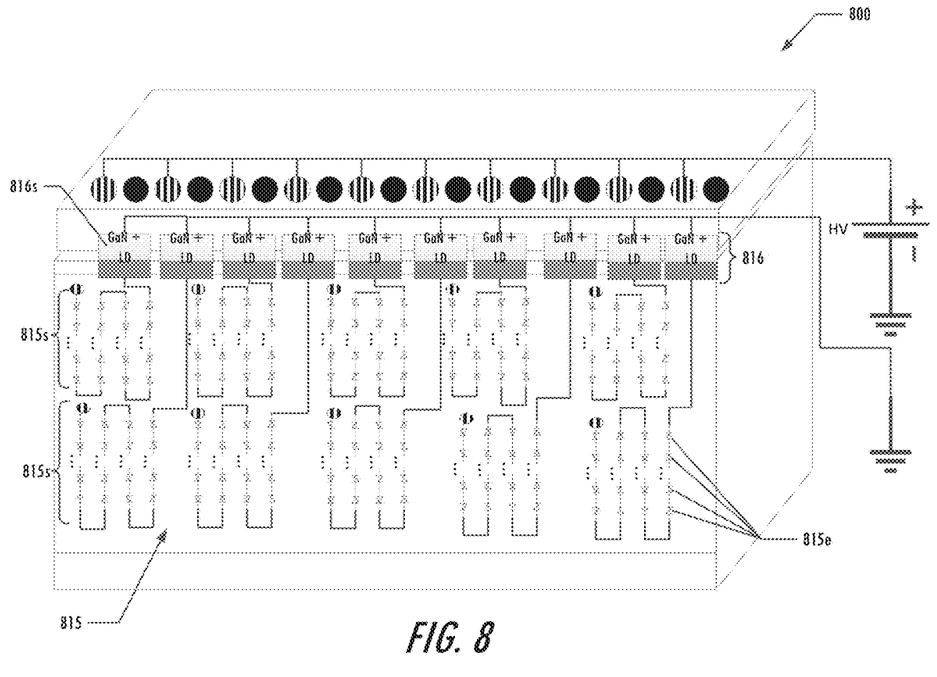
FIGS. 8 and 9 are block diagrams illustrating example system configurations including sub-arrays of emitters and associated sub-driver circuits in accordance with some embodiments described herein.
Figure 9:
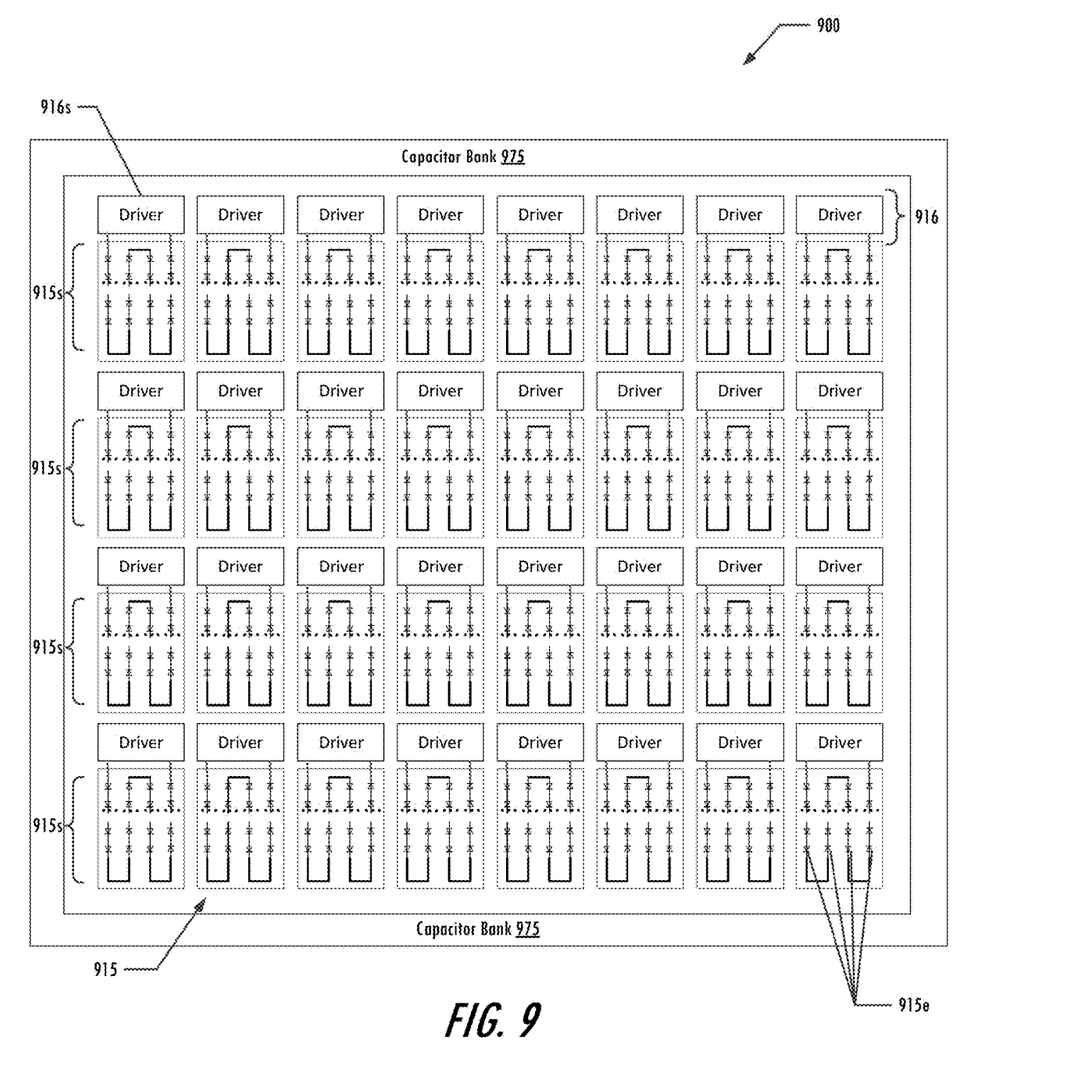

FIGS. 8 and 9 illustrate system configurations 800, 900 that provide respective (emitter and/or detector) control signals to sub-arrays of emitters 815*e*, 915*e*. The emitters 815*e*, 915*e* are described in FIGS. 8 and 9 with reference to vertical cavity surface emitting lasers (VCSELs) and high voltage (HV) and ground connections by way of example, but it will be understood that emitter arrays as described herein are not so limited.

As shown in FIGS. 8 and 9, arrays 815, 915 of VCSELs 815*e*, 915*e* are laid out such that some VCSELs 815*e*, 915*e* are connected in series and in close vicinity (e.g., as a string of emitters), providing respective emitter sub-arrays 815*s*, 915*s*. Each string or sub-array 815*s*, 915*s* is connected to a respective driver sub-circuit 816*s*, 916*s*, each of which may include a power transistor and local control circuitry that are configured to provide respective emitter control signals to the respective sub-arrays 815*s*, 915*s*. The driver sub-circuit 816*s*, 916*s* may also include one or more capacitors (implemented as capacitor banks 975 laid out at a periphery of the array 915 in FIG. 9) for local charge storage with a reduced or minimal inductive path to the VCSELs 815*e*, 915*e*. Each driver sub-circuit 816*s*, 916*s* is electrically connected to an external control circuit (e.g., control circuit 105 of FIG. 1). In some implementations, one or more capacitors are placed on the substrate having the emitter array 815, 915 thereon (or in close proximity to the substrate) such that sufficient charge is collected in the capacitors to provide for the required temporal drive of the VCSEL pulses as the emitter control signals, without excessive inductance effects.

Lidar systems and arrays described herein may be applied to ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be vertical cavity surface emitting lasers (VCSELs). In some embodiments, the emitter array may include a non-native substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Patent Application Publication No. 2018/0301872 to Burroughs et al., filed Apr. 12, 2018, with the United States Patent and Trademark Office, the disclosure of which is incorporated by reference herein.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts. The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

It will be understood that when an element is referred to or illustrated as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation, the scope of the present invention being set forth in the following claims.

The invention claimed is:

1. A method of operating a LIDAR system, the method comprising:
   performing, by a control circuit, operations comprising:
      receiving, from a detector array that is configured to image a field of view, respective detection signals that are output from detector elements of the detector array responsive to light incident thereon;
      generating, respective detector control signals that differ based on a signal strength of the respective detection signals, the respective detector control signals controlling a gain of the detector elements;
      generating, respective emitter control signals that differ based on the signal strength of the respective detection signals of the corresponding detector elements,
      wherein respective optical signals of respective emitter sub-arrays of an emitter array are output at a same time and differ responsive to the respective emitter control signals; and
      wherein the signal strengths of the respective detection signals output from a first subset and a second subset of the detector elements indicate a first reflectance and a second reflectance of a first target and a second target in the field of view, respectively, wherein the first reflectance is less than the second reflectance, resulting in a first gain for the first subset of the detector elements being greater than a second gain for the second subset of the detector elements and resulting in a first power level of a first optical signal of a first emitter element corresponding to the first subset of the detector elements being greater than a second power level of a second optical signal of a second emitter element corresponding to the second subset of the detector elements.

2. The method of claim 1, wherein the respective detection signals output from first and second subsets of the detector elements indicate first and second reflectances of first and second targets in the field of view, respectively, wherein the first reflectance is less than the second reflectance.

3. The method of claim 2, wherein the respective emitter control signals that differ are configured to simultaneously activate first and second subsets of the emitter elements at different spatial locations of the emitter array to emit first and second optical signals at the same time, respectively, based on respective spatial correlations thereof with the first and second subsets of the detector elements, respectively, wherein the first and second optical signals differ.

4. The method of claim 2, wherein the respective optical signals comprise first and second optical signals having first and second power levels, respectively, wherein the first power level is greater than the second power level.

5. The method of claim 2, wherein the operations further comprise:
generating respective detector control signals that differ based on the respective detection signals and respective spatial correlations of the emitter elements and the detector elements with respect to the field of view.

6. The method of claim 5, wherein the respective detector control signals are configured to activate the first and second subsets of the detector elements for first and second durations of time or sensitivity levels, respectively, wherein the first duration or sensitivity level is greater than the second duration or sensitivity level.

7. A LIDAR system, comprising:
a control circuit configured to:
generate respective detector control signals that differ based on a signal strength of respective detection signals, the respective detector control signals controlling a gain of a detector element;
generate respective emitter control signals that differ based on the signal strength of the respective detection signals of corresponding detector elements;
wherein respective optical signals of respective emitter sub-arrays of an emitter array are output to a plurality of emitter elements to emit respective optical signals at a same time and at respective power levels that differ responsive to the respective emitter control signals, and
wherein the signal strengths of the respective detection signals output from a first subset and a second subset of the detector elements indicate a first reflectance and a second reflectance of a first target and a second target in a field of view, respectively, wherein the first reflectance is less than the second reflectance, resulting in a first gain for the first subset of the detector elements being greater than a second gain for the second subset of the detector elements and resulting in a first power level of a first optical signal of a first emitter element corresponding to the first subset of the detector elements being greater than a second power level of a second optical signal of a second emitter element corresponding to the second subset of the detector elements-based on receiving respective detection signals from a plurality of detector elements indicating respective reflectances of one or more targets in a field of view thereof, and based on respective spatial correlations of the emitter elements and the detector elements with respect to the field of view.

8. The LIDAR system of claim 7, further comprising:
a detector array comprising the detector elements, wherein the control circuit is further configured to output respective detector control signals that are configured to control operation of first and second subsets of the detector elements at first and second spatial locations of the detector array for different first and second durations of time or sensitivity levels, respectively, based on the respective detection signals and respective spatial correlations.

9. The LIDAR system of claim 7, further comprising:
an emitter array comprising first and second emitter sub-arrays including first and second subsets of the emitter elements, respectively; and
a driver circuit comprising first and second driver sub-circuits coupled to the first and second emitter sub-arrays, respectively,
wherein the control circuit is configured to operate the first and second driver sub-circuits to generate the respective emitter control signals that differ to simultaneously control operation of the first and second subsets of the emitter elements at first and second spatial locations of the emitter array to emit first and second optical signals at the same time with different first and second power levels, respectively, based on the respective detection signals and respective spatial correlations.

10. The LIDAR system of claim 9, wherein one or more targets comprise first and second targets and the respective reflectances indicate first and second reflectances thereof, respectively, wherein the first reflectance is less than the second reflectance, and wherein the first power level is greater than the second power level.

11. A LIDAR system, comprising:
an emitter array configured to illuminate a field of view, the emitter array comprising emitter elements configured to emit respective optical signals responsive to respective emitter control signals, wherein respective subsets of the emitter elements define respective emitter sub-arrays;
a driver circuit comprising respective driver sub-circuits coupled to the respective emitter sub-arrays;
a detector array configured to image the field of view, the detector array comprising detector elements configured to output respective detection signals responsive to light incident thereon and respective detector control signals; and
a control circuit configured to operate the respective driver sub-circuits to:
generate respective detection control signals that differ based on a signal strength of the respective detection signals, the respective detector control signals controlling a gain of the detector elements; and
generate the respective emitter control signals that differ based on the signal strength of the respective detector signals of the corresponding detector elements;
wherein the respective optical signals of the respective emitter sub-arrays of the emitter array are output at a same time and differ responsive to the respective emitter control signals, and
wherein the signal strengths of the respective detection signals output from a first subset and a second subset of the detector elements indicate a first reflectance and a second reflectance of a first target and a second target in the field of view, respectively, wherein the first reflectance is less than the second reflectance, resulting in a first gain for the first subset of the detector elements being greater than a second gain for the second subset of the detector elements and resulting in a first power level of a first optical signal of a first emitter element corresponding to the first subset of the detector elements being greater than a second power level of a second optical signal of a second emitter element corresponding to the second subset of the detector elements.

12. The LIDAR system of claim 11, wherein the respective detection signals indicate relative motion between the LIDAR system and a target in the field of view, wherein the control circuit is configured to estimate an expected position of the target in the field of view based on the relative motion, and wherein the respective optical signals differ based on the expected position of the target and respective spatial correlations of the emitter elements with respect to the field of view.

13. The LIDAR system of claim 11, wherein the LIDAR system is configured to be coupled to a vehicle such that the emitter and detector arrays are oriented relative to an intended direction of travel of the vehicle.

14. The LIDAR system of claim 11, wherein the detector elements comprise single-photon detectors.

15. The LIDAR system of claim 11, wherein the emitter sub-arrays respectively comprise a plurality of lasers connected in series to a respective one of the driver sub-circuits.

16. The LIDAR system of claim 11, wherein respective spatial correlations of the emitter elements and the detector elements include predetermined data comprising direct emitter-detector correlations.

17. The LIDAR system of claim 11, wherein the respective detection signals output from first and second subsets of the detector elements indicate first and second reflectances of first and second targets in the field of view, respectively, wherein the first reflectance is less than the second reflectance.

18. The LIDAR system of claim 17, wherein the respective detection signals output from first and second subsets of the detector elements indicate the first and second reflectances, respectively, responsive to the first target being located at a greater distance from the detector array than the second target.

19. The LIDAR system of claim 17, wherein the respective emitter control signals that differ are configured to simultaneously activate first and second subsets of the emitter elements at different spatial locations of the emitter array to emit first and second optical signals at the same time, respectively, based on respective spatial correlations thereof with the first and second subsets of the detector elements, respectively, wherein the first and second optical signals differ.

20. The LIDAR system of claim 19, wherein the first and second optical signals have first and second power levels, respectively, wherein the first power level is greater than the second power level.

21. The LIDAR system of claim 17, wherein the respective detector control signals are configured to alter respective gains of the detector elements based on the respective detection signals and respective spatial correlations of the emitter elements and the detector elements with respect to the field of view.

22. The LIDAR system of claim 21, wherein the respective detector control signals are configured to activate the first and second subsets of the detector elements for first and second durations of time or sensitivity levels, respectively, wherein the first duration or sensitivity level is greater than the second duration or sensitivity level.

23. The LIDAR system of claim 22, wherein the respective detector control signals comprise first and second pulse widths corresponding to the first and second durations, or first and second bias voltages corresponding to the first and second sensitivity levels, respectively.

* * * * *